April 21, 1959 H. L. BARSALOU 2,882,580
AIRCRAFT PANEL FASTENER
Filed Nov. 8, 1956
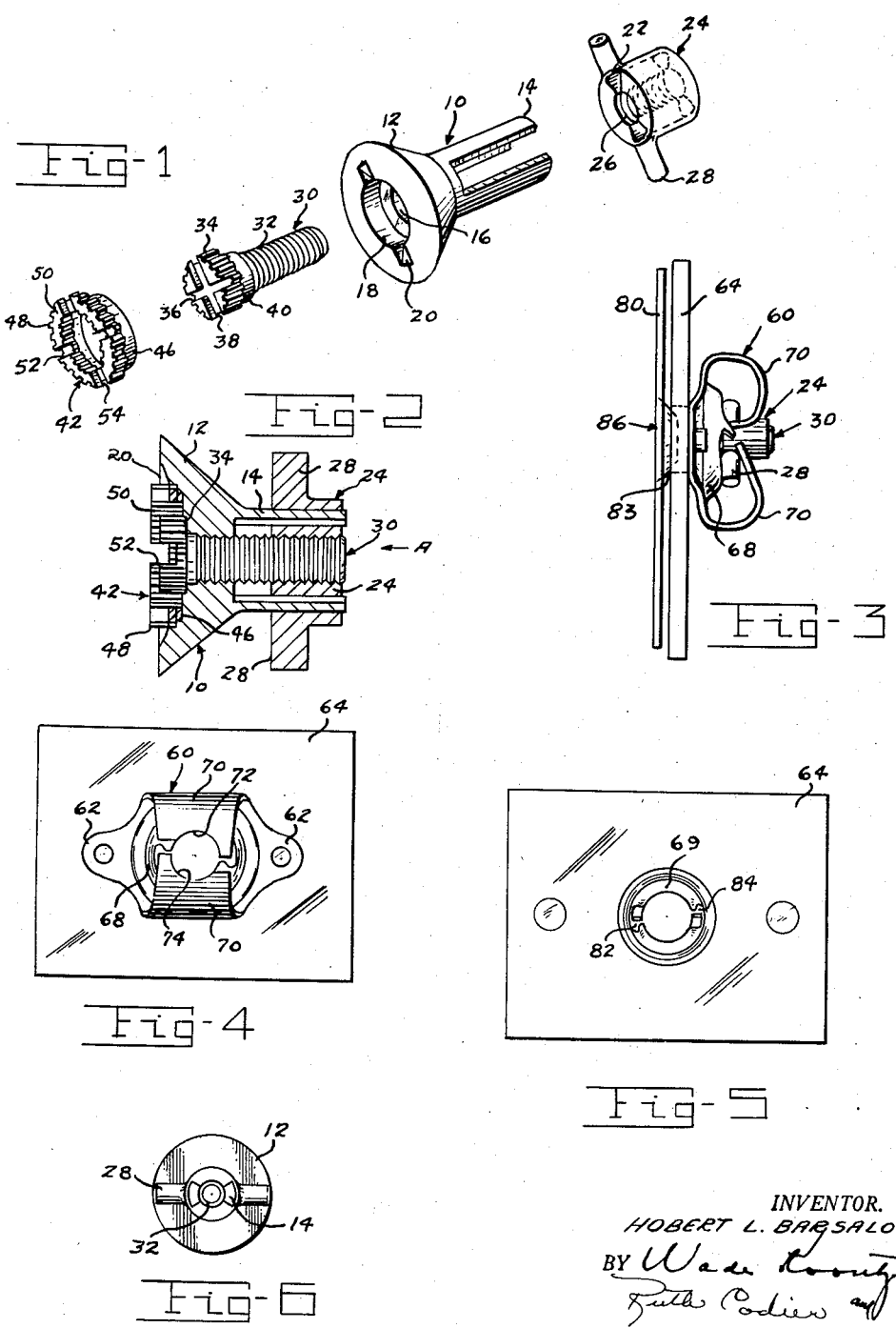
INVENTOR.
HOBERT L. BARSALOU
BY
ATTORNEYS

2,882,580

AIRCRAFT PANEL FASTENER

Hobert L. Barsalou, Dayton, Ohio

Application November 8, 1956, Serial No. 621,188

3 Claims. (Cl. 24—221)

(Granted under Title 35, U.S. Code (1952), sec. 266)

The invention described herein may be manufactured and used by or for the United States Government for governmental purposes without payment to me of any royalty thereon.

This invention relates to an aircraft panel fastener, and more particularly to an adjustable device which can be adjusted to accommodate varying thicknesses and different spacing of panels.

Many devices have been contrived for fastening metal panels together, and for fastening fixtures of various kinds to metal. In the usual application of these fasteners, due to the different thicknesses of, or spacing of panelling, and other varying conditions, a different size of fastener is required for each specific condition of use.

In some of these devices, where attachments are to be made to metal which is relatively soft, a corrugated or serrated surface is driven into the soft material of the panelling for obtaining a permanent attachment.

The object of the present invention is the provision of a single fastener stud assembly device which can be adjusted to accommodate a range of varying conditions, including varying panel thicknesses and spacing, obviating the necessity of manufacturing and stocking many different lengths of studs.

A further object of the invention is the provision of a new relationship between a screw element and a sliding element to produce a fastener which is initially adjustable, and is subsequently rendered permanent in one chosen position of adjustment.

A further object of the invention is the provision of a fastener stud assembly wherein an initially adjustable stud is adjusted to the position called for in the conditions of its immediate use, and which is subsequently made permanent in this position by means of a serrated member driven into softer material in a member of the stud assembly.

A further object of the invention is the provision of a panel stud fastener which has an integral cross-pin, obviating loss of cross pins, and providing an added safety factor.

A further object of the invention is the provision of a simply designed device which can be economically manufactured with conventional tools.

In the drawings:

Figure 1 is an exploded view of the parts of the panel fastener assembly.

Figure 2 is a cross section of the four elements of the stud fastener in assembled condition.

Figure 3 is a side elevation of the stud fastener attached to a permanent structure.

Figure 4 is a front view of a locking spring or receptacle member.

Figure 5 is a rear view of a spring locking or receptacle member attached to a plate or panel.

Figure 6 is an end view of the assembled stud fastener, looking in the direction of the arrow A in Figure 2.

Referring more in detail to the drawing: The stud fastener is composed of the four elements shown in Figure 1. A spacing member 10 is provided with a frusto conical section 12, and a pair of axially extending, arcuately cross sectioned keying pins or legs 14. The section 12 is provided with a bore 16 and a counterbore 18. The counterbore 18 has a smooth curved surface without serrations, and is provided with diametrically opposed cut-out portions or slots 20. The legs or keying pins 14 are formed to slide into keyhole openings 22 in a collar element 24, and be slidably splined therein. The collar element 24 is provided with internal screw threads 26 and a pair of radially extending and diametrically positioned arms or pins or beams 28. A stud 30 of the Rosan type is provided with the external screw threads 32, and a head member 34. The head member 34 is provided with a pair of normally disposed channels or slots 36 and 38. Its circumference is serrated as shown at 40.

A collar or ring 42 is of the conventional Rosan ring type. It is provided with an annular undercut portion 46, and is serrated on its external circumference at 48, and its internal circumference at 50. It is also provided with normally related radial slots 52 and 54 which can be set to communicate with, and form extensions of, the slots 36 and 38 of the member 30, and also the slots 20 of the member 10.

The locking spring element or receptacle 60 is shown in side elevation in Figure 3, and in front and rear elevations in Figures 4 and 5 respectively. Its components are a pair of ears 62 which fasten to a door or other panel 64, augmenting the spring pressure between these elements if desired.

The spring locking means 60 is provided with a pair of cam surfaces 68 and a pair of spring arms 70 curving upwardly and inwardly over the camming portions 68 and formed with complementary concaved semicircular portions 72 and 74. These semicircular complementary portions are formed to receive the protruding end of the member 24.

The plate 80 is provided with an annular concaved surface 83, a concentric circular opening 86, and a pair of diametrically opposed slots (not shown).

In the operation of the device, the members 24, 10, 30 and 42 are assembled as a unit in the following manner: Key pins or legs 14 are slipped into the slots 22 of the member 24. The screw member 30 is then inserted through the bore 16 and engaged into the screw threads 26 of the collar 24. The width and spacing of the panel 64 determine the desired ultimate relative positions of the members 24 and 10. These members are slid relative to each other until this position is found. The member 30 is further screwed into the member 24 by means of a Phillips screw driver, or other suitable tool, until the correct tension is obtained. The Rosan ring 42 is then slipped over the head 34. The serrations 50 engage the serrations 40. Then, by means of a rivet squeezer, hammer and bucking bar, or other suitable means, the serrations 48 the ring 42 are pounded into the smooth surface of the bore 18 so that now members 30 and 10 are no longer rotatable relative to each other, and the position of the member 24 upon the legs 14 is also fixed, and they are no longer relatively slidable. These positions are now permanent and can only be changed with the use of special tools.

The fastener stud, comprising the four parts shown in Figure 1, is now an assembled unit, such as is shown in Figure 2. Its operation as a stud fastener in securing metal or other panels to one another will now be described. The unit is inserted, first through the opening in the panel 80, then through the opening provided in the panel 64.

The arms 28 are suitably manipulated to travel through the slots (not shown) in the panel 80, through an opening in the panel 64, and through the slots 82 and 84 provided between the cam surfaces 68 in the base of the spring locking member 60. With arms 28 now engaging the camming surfaces 68, the stud is rotated by means of a suitable screw driver or other tool. The arms 28 ride up onto the camming surfaces 68. Tension is now brought upon the spring member 60, increased or decreased as the stud is rotated in one direction or the other.

It will be seen that the slots 52 and 54 have been brought into alignment with the slots 36 and 38 to form a continuous screw driver hold for adjusting the fastener. The slot 54 coincides with the slot 38, which in turn coincides with the slots 20 in the member 14. It will thus be seen that a screw driver can span the member 30, the Rosan ring 32, and engage also the slots 20, so that now the assembly can be manipulated with a screw driver as a unit, for engaging and disengaging the stud assembly from the spring locking means or receptacle 60.

It will be understood for example, that other types of fasteners can be substituted for the spring locking means 60. Also the slots 52, 54 and 20 may be omitted from the ring 42 and the member 10, and the assembly unit be manipulated by a Phillips screw driver engaged only in the stud head 34.

What I claim is:

1. An airplane panel fastener comprising a spacing member provided with an annular frusto conical section and a pair of axially positioned keying members, said frusto conical section being also provided with a smooth surfaced concentrically positioned bore having slots extending radially therefrom, a collar, internal screw threads on said collar, said collar also provided with axially extending internally located keyhole slots extending radially from said bore for sliding spline engagement with said keying members, said collar encircling said keying members, cross pins on said collar, a threaded stud extendable through the bore in said frusto conical section and threadedly engageable with the internal screw threads of said collar, a head on said stud provided with normally placed intersecting slots for screw driver engagement, said head also being provided with circumferential serrations, a ring provided with diametrically positioned and radially extending slots adapted for communicative positioning with the slots on said head and the slots in said frusto conical section, serrations on the internal circumference of said ring for engaging the circumferential serrations on said head, serrations on the external circumference of said ring for impinging into the smooth surface of said first mentioned bore, whereby rotation and sliding action between the elements of assembly are prevented and whereby said elements may be manipulated as a unit.

2. In a panel fastener stud, a collar having cross beams for engagement with a locking receptacle, a spacing member encircled by said collar and having splined and sliding engagement therein, a threaded stud extendable rotatably through said member and threadedly engaging a bore in said collar, a ring for effecting a rigid connection between said spacing member and said threaded stud, whereby all of said above mentioned elements are adjusted with relation to each other and to the panel and are held rigid with respect to each other and are manipulatable as a unit.

3. In a panel fastener stud, a collar having means for engagement with a locking receptacle, a spacing and keying member encircled by said collar adapted for splined and sliding engagement in said collar, means for preventing sliding movement and effecting permanent predetermined positioning of said collar on said spacing member, said means comprising a threaded stud rotatably extending through a smooth bore in said spacing member and threadedly engaging said collar, a ring adapted for nonrotating engagement with said threaded stud and means on said ring for effecting nonrotating engagement with said spacing member.

References Cited in the file of this patent
UNITED STATES PATENTS

| | | |
|---|---|---|
| 2,378,638 | Johnson | June 19, 1945 |
| 2,385,180 | Allen | Sept. 18, 1945 |
| 2,400,318 | Rosan | May 14, 1946 |
| 2,486,670 | Nigg | Nov. 1, 1949 |
| 2,545,045 | Rosan | Mar. 13, 1951 |
| 2,550,867 | Rosan | May 1, 1951 |

FOREIGN PATENTS

| | | |
|---|---|---|
| 564,108 | Great Britain | Sept. 13, 1944 |